Figure 1:
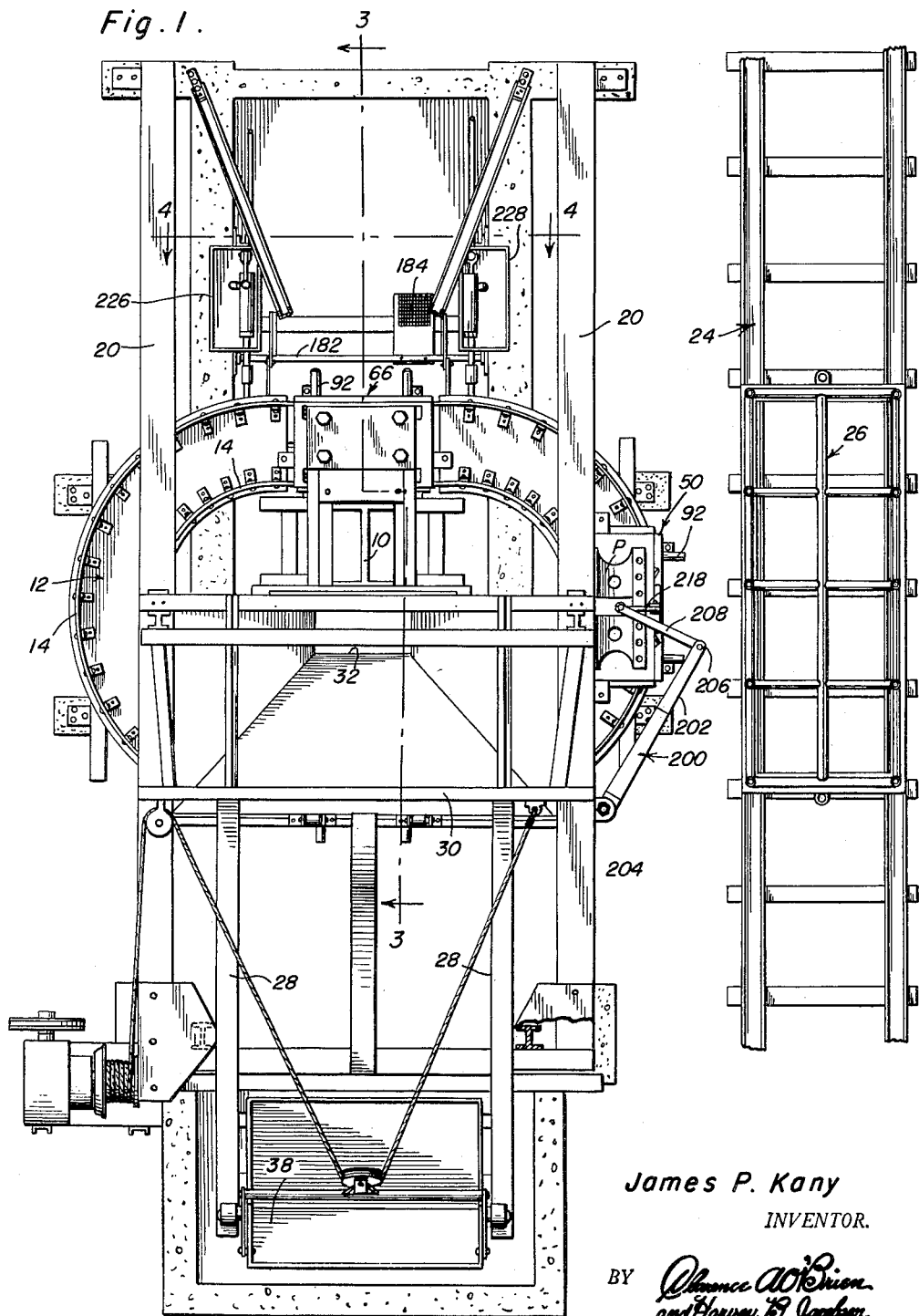

Feb. 27, 1951 J. P. KANY 2,543,292
APPARATUS FOR MOLDING PLASTIC AGGREGATE
Filed May 14, 1948 11 Sheets-Sheet 1

James P. Kany
INVENTOR.

BY *Clarence A. O'Brien
and Harvey B. Jacobson*
Attorneys

Feb. 27, 1951  J. P. KANY  2,543,292
APPARATUS FOR MOLDING PLASTIC AGGREGATE
Filed May 14, 1948  11 Sheets-Sheet 8

James P. Kany
INVENTOR.

BY Clarence A. O'Brien
and Harvey B. Jacobson
Attorneys

Feb. 27, 1951  J. P. KANY  2,543,292
APPARATUS FOR MOLDING PLASTIC AGGREGATE
Filed May 14, 1948  11 Sheets-Sheet 9

James P. Kany
INVENTOR.

BY Clarence A. O'Brien
and Harvey B. Jackson
Attorneys

Feb. 27, 1951 J. P. KANY 2,543,292
APPARATUS FOR MOLDING PLASTIC AGGREGATE
Filed May 14, 1948 11 Sheets-Sheet 10

James P. Kany
INVENTOR.

BY Clarence A. O'Brien
and Harvey B. Jacobson
Attorneys

Feb. 27, 1951  J. P. KANY  2,543,292
APPARATUS FOR MOLDING PLASTIC AGGREGATE
Filed May 14, 1948  11 Sheets-Sheet 11

James P. Kany
INVENTOR.

BY Clarence A. O'Brien
and Harvey B. Jacobson
Attorneys

Patented Feb. 27, 1951

2,543,292

UNITED STATES PATENT OFFICE 2,543,292

APPARATUS FOR MOLDING PLASTIC AGGREGATE

James P. Kany, Ramona, Calif.

Application May 14, 1948, Serial No. 27,057

12 Claims. (Cl. 25—2)

1

This invention relates to a method and apparatus for molding plastic aggregate and more particularly for the formation of structural units, such as concrete building blocks and the like.

The primary object of the invention is to charge a mold, compress the mold charge in the mold to produce a product of the desired density, eject the product from the mold and transfer it to a conventional carrier for subsequent hardening treatment.

Another object is to form in the plastic aggregate suitable core spaces to improve the insulating qualities of the product, and reduce the weight of the finished product.

A further object is to deposit a charge of plastic aggregate in the mold, advance the mold in a closed horizontal path to an aggregate compressing and product ejecting station, compress the aggregate in the mold at the compressing station, immediately after compressing the aggregate ejecting the finished product from the mold and supporting it in spaced relation to the mold, transferring the mold with the ejected product supported thereon to a product transfer station, and transferring the product at the product transfer station to a conventional kiln car.

The above and other objects may be attained by employing this invention which embodies among its features a mold movable in a closed path from a pallet loading station to an aggregate feeding station, said mold being advanced along said path to an aggregate compressing station and a product ejecting station and said mold being movable along said path to a product transfer station.

Other features include a product ejector movable in a rectilinear path coincident with the path of movement of the aggregate compressing plunger for ejecting the molded product from the mold, and means carried by the mold to support the ejected product in spaced relation thereto.

Still other features include depressible track sections at the aggregate compressing station adapted to drop under the weight of the mold, a bed plate between the depressible track sections upon which the dropped mold is supported during the aggregate compressing operation and means operable through the bed plate to eject the molded product from the mold.

Still other features include means to lift the depressible track sections with the extraction of the press head from the mold.

In the drawings:

Figure 1 is a top plan view of apparatus for

Figure 2:
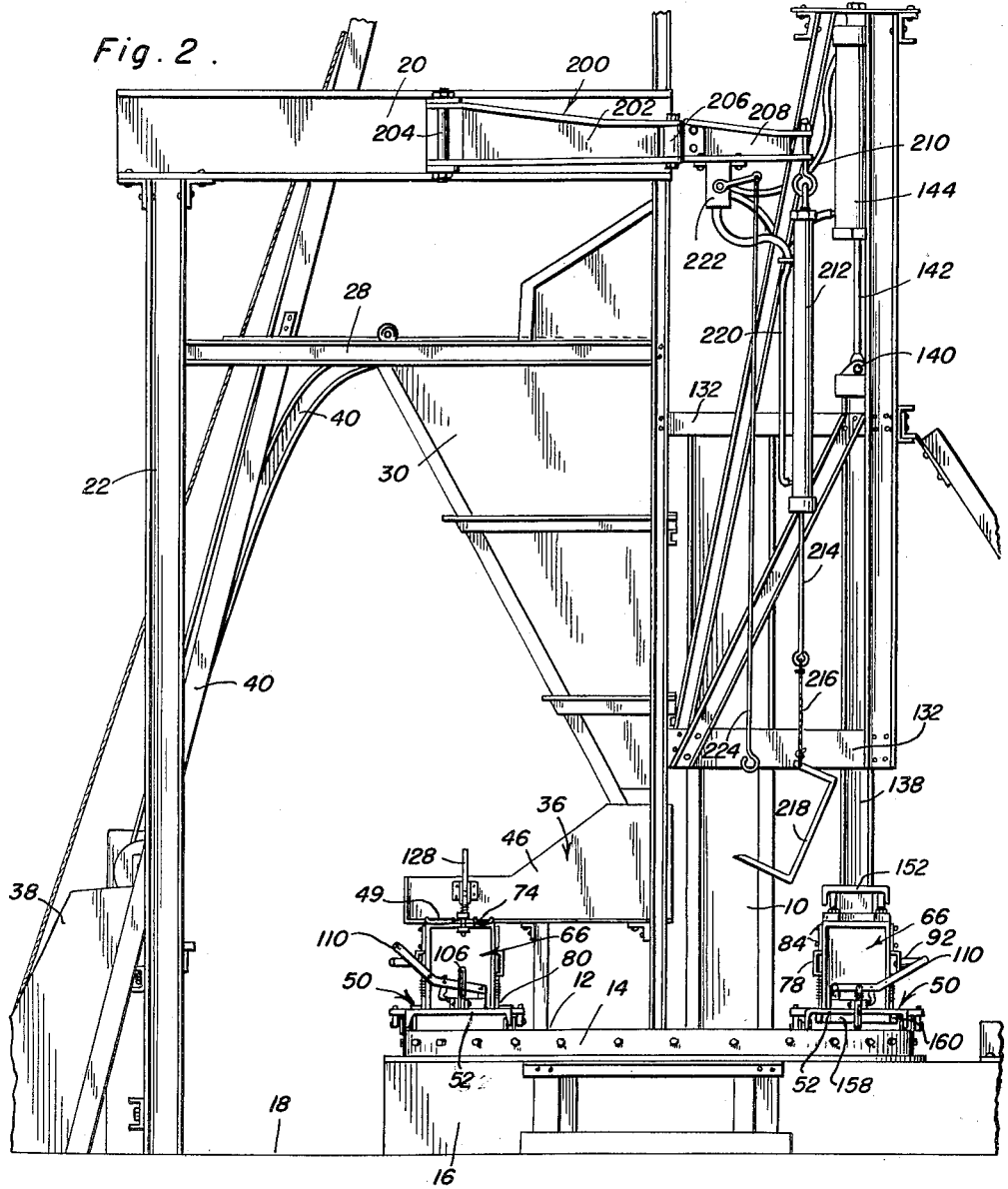
Figure 3:
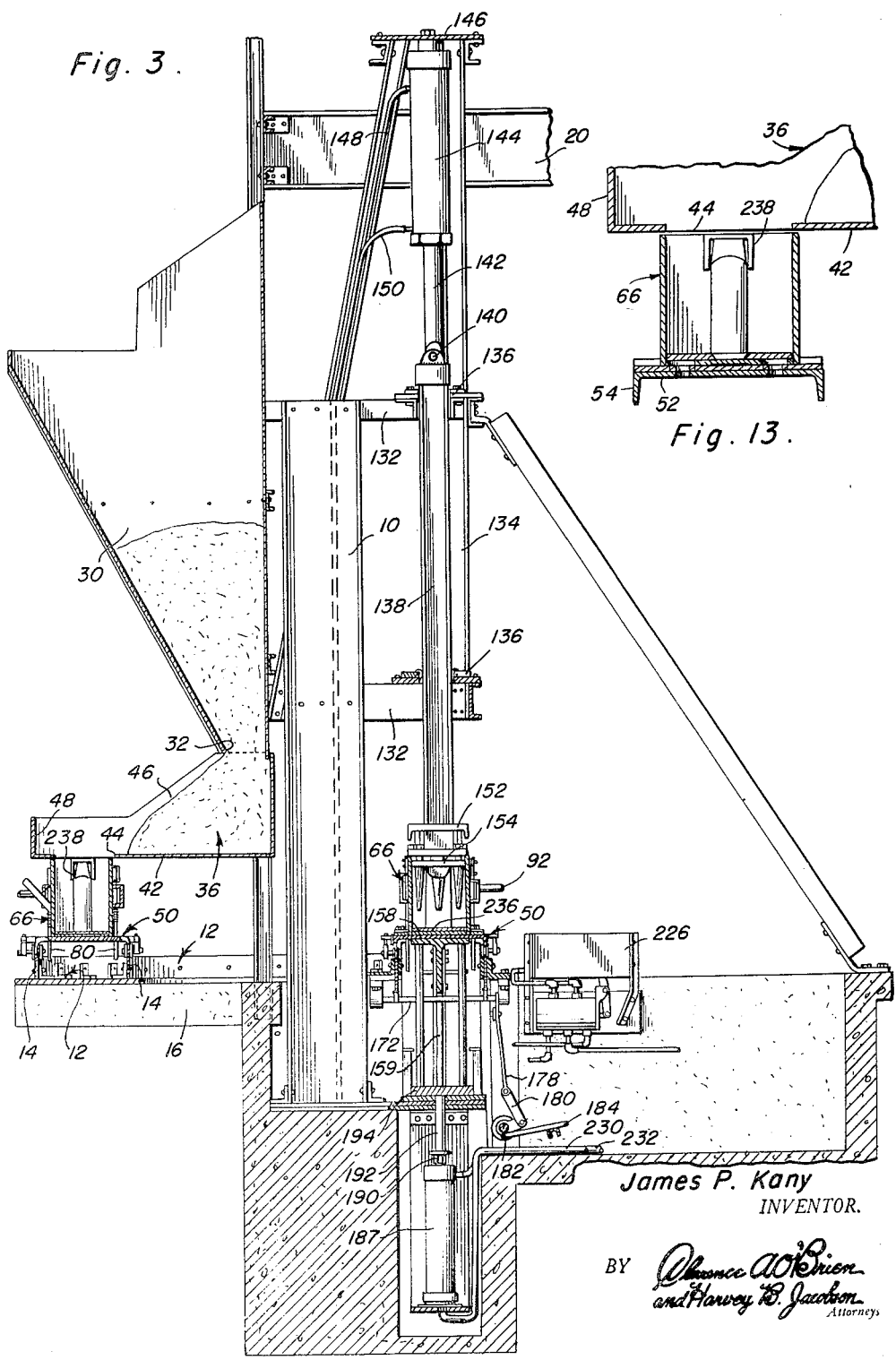
Figure 4:
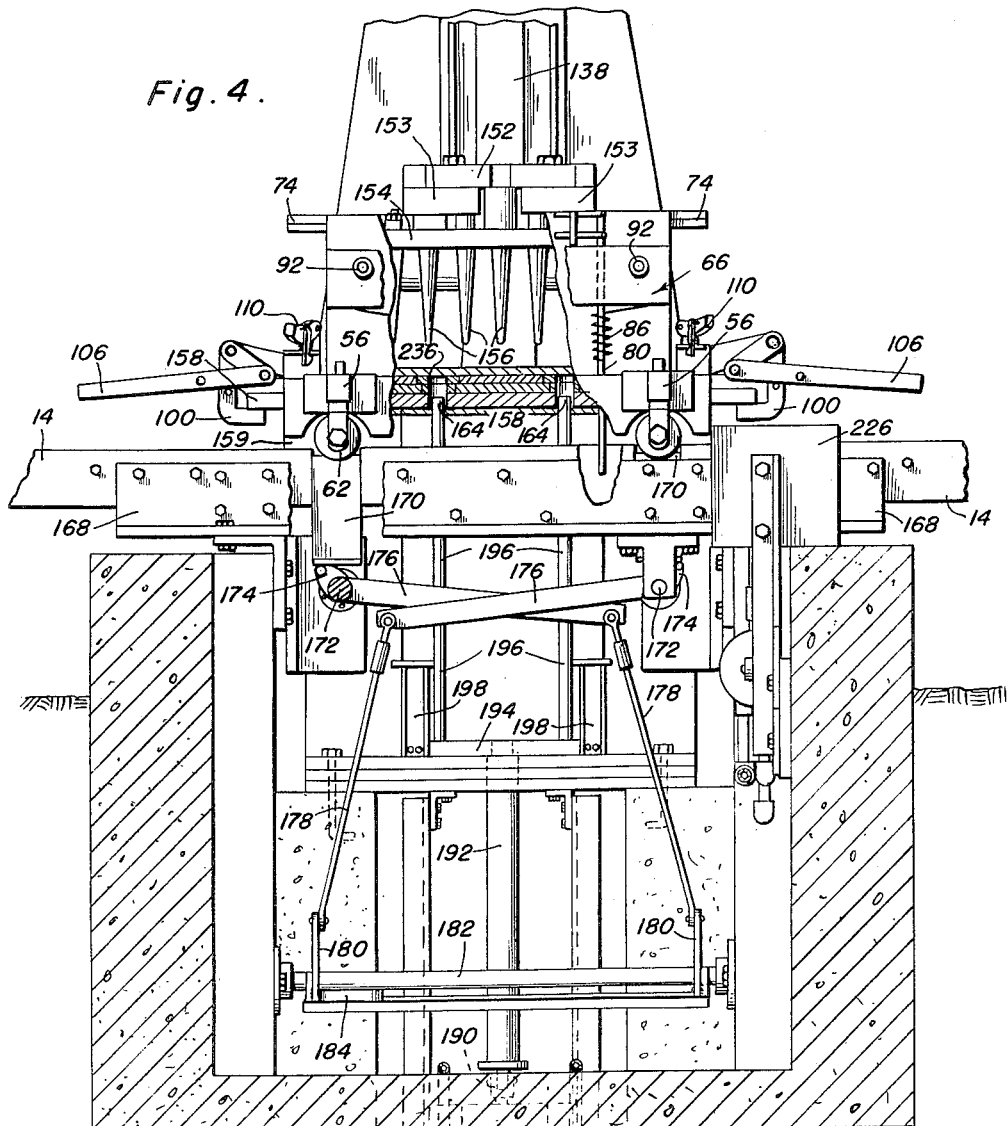
Figure 5:
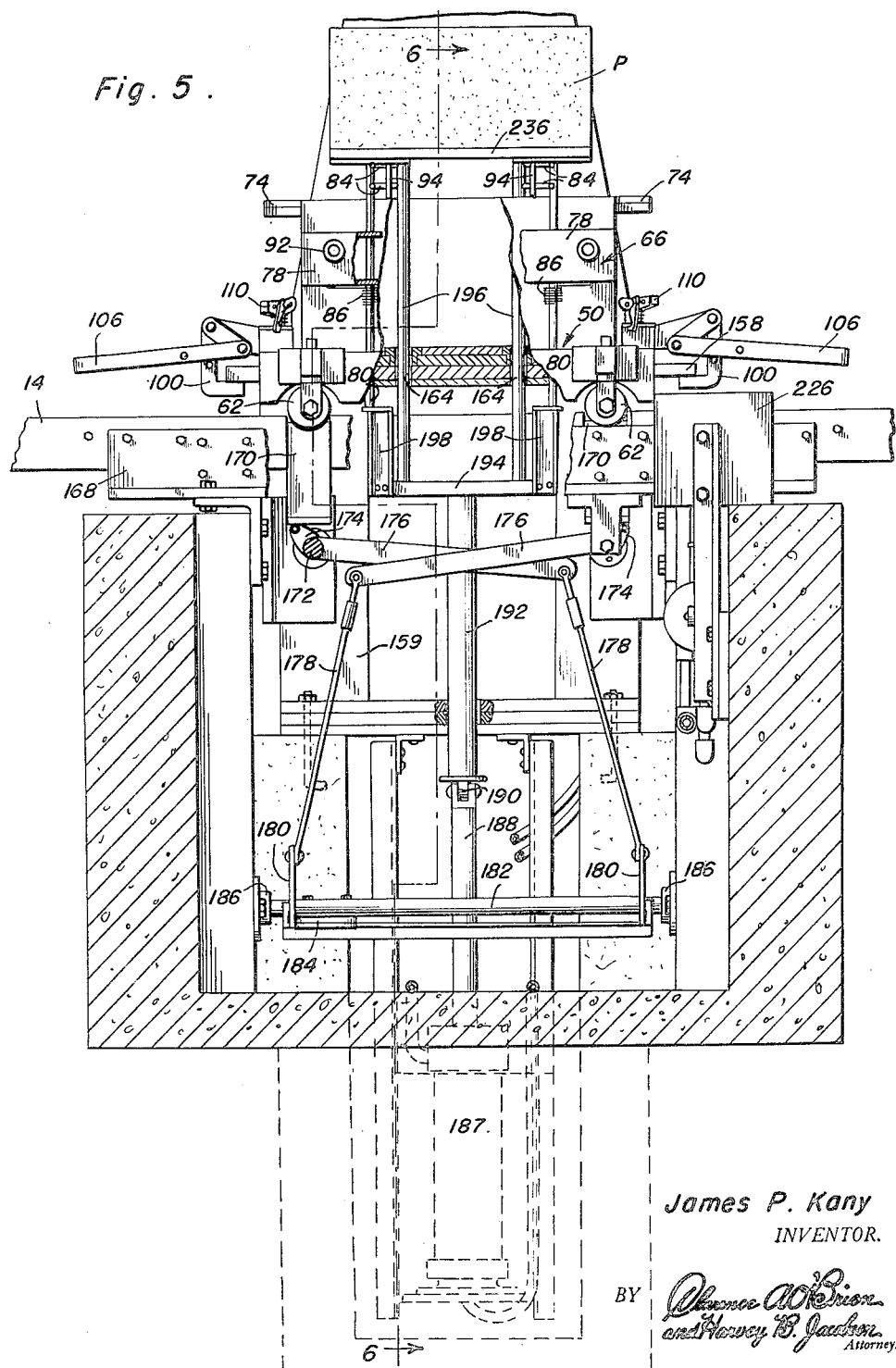
Figure 6:
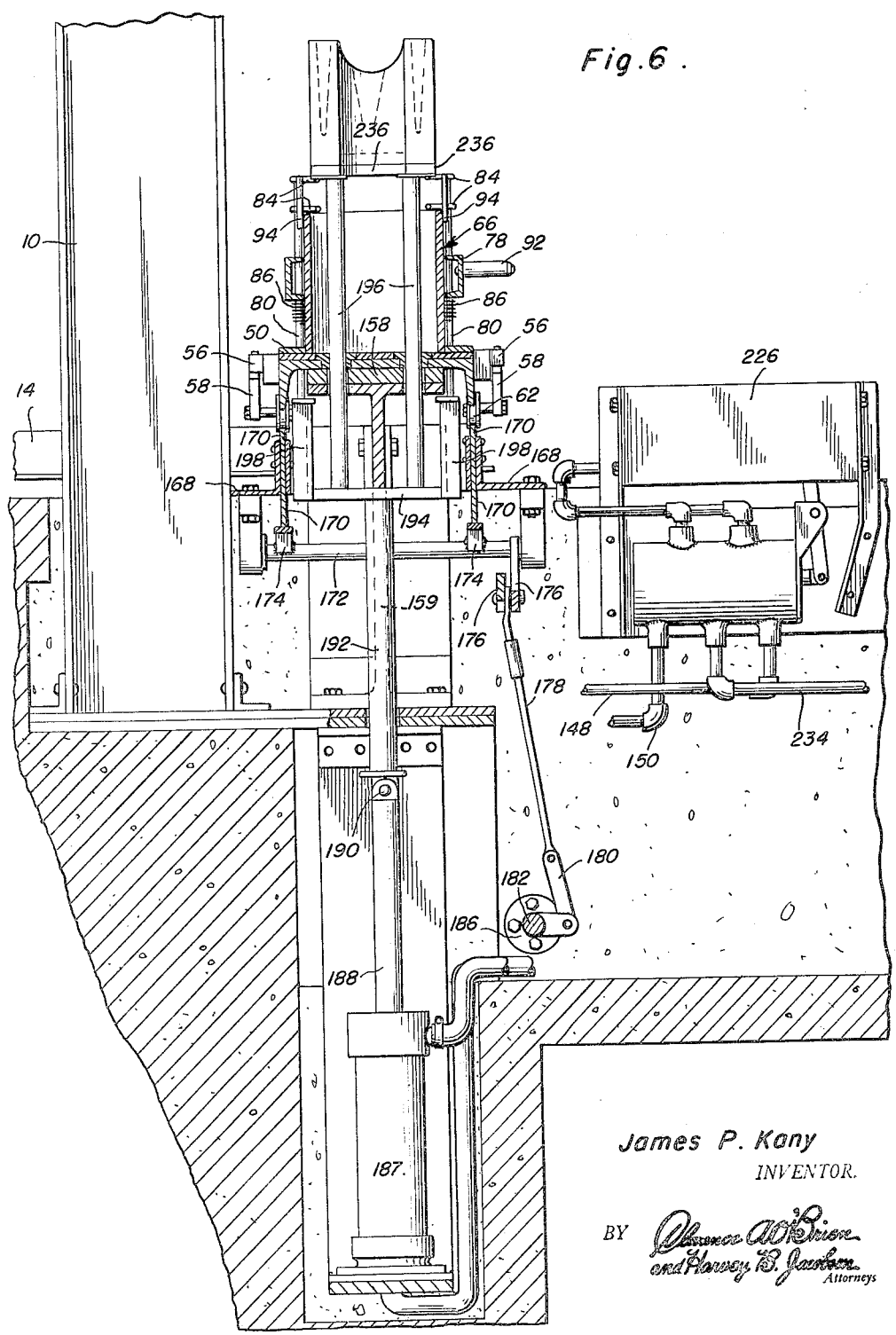
Figure 7:
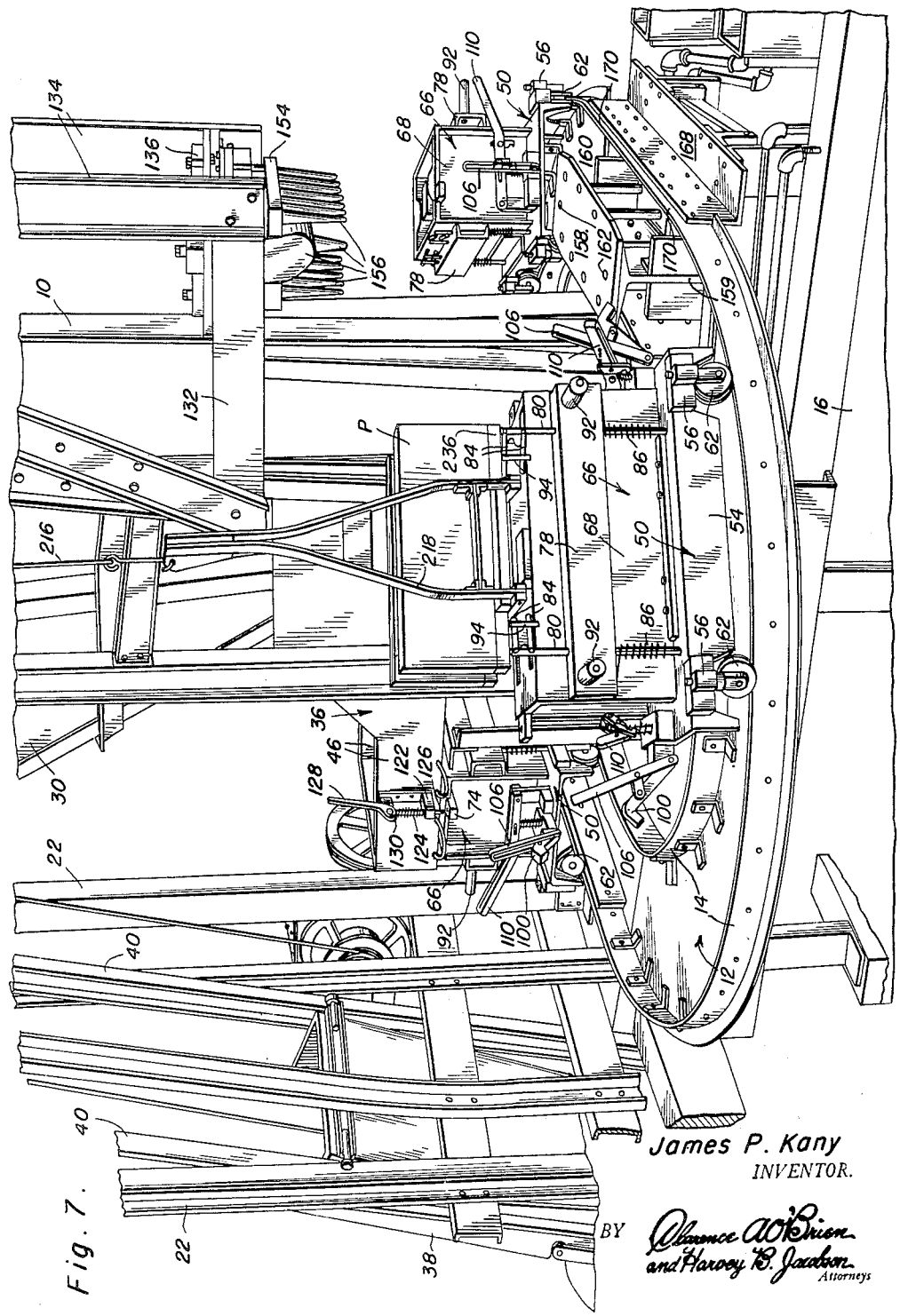
Figure 8:
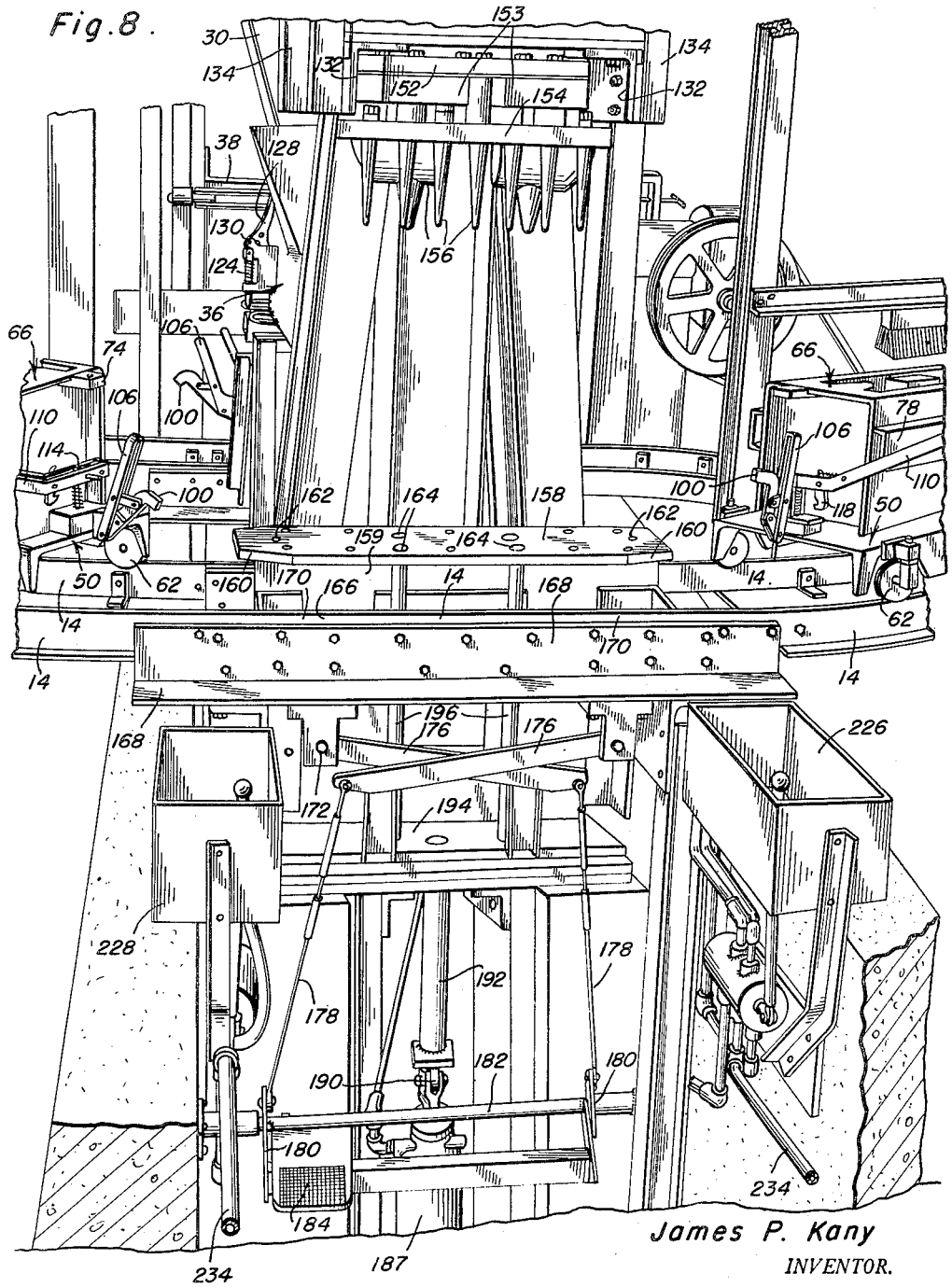
Figure 9:
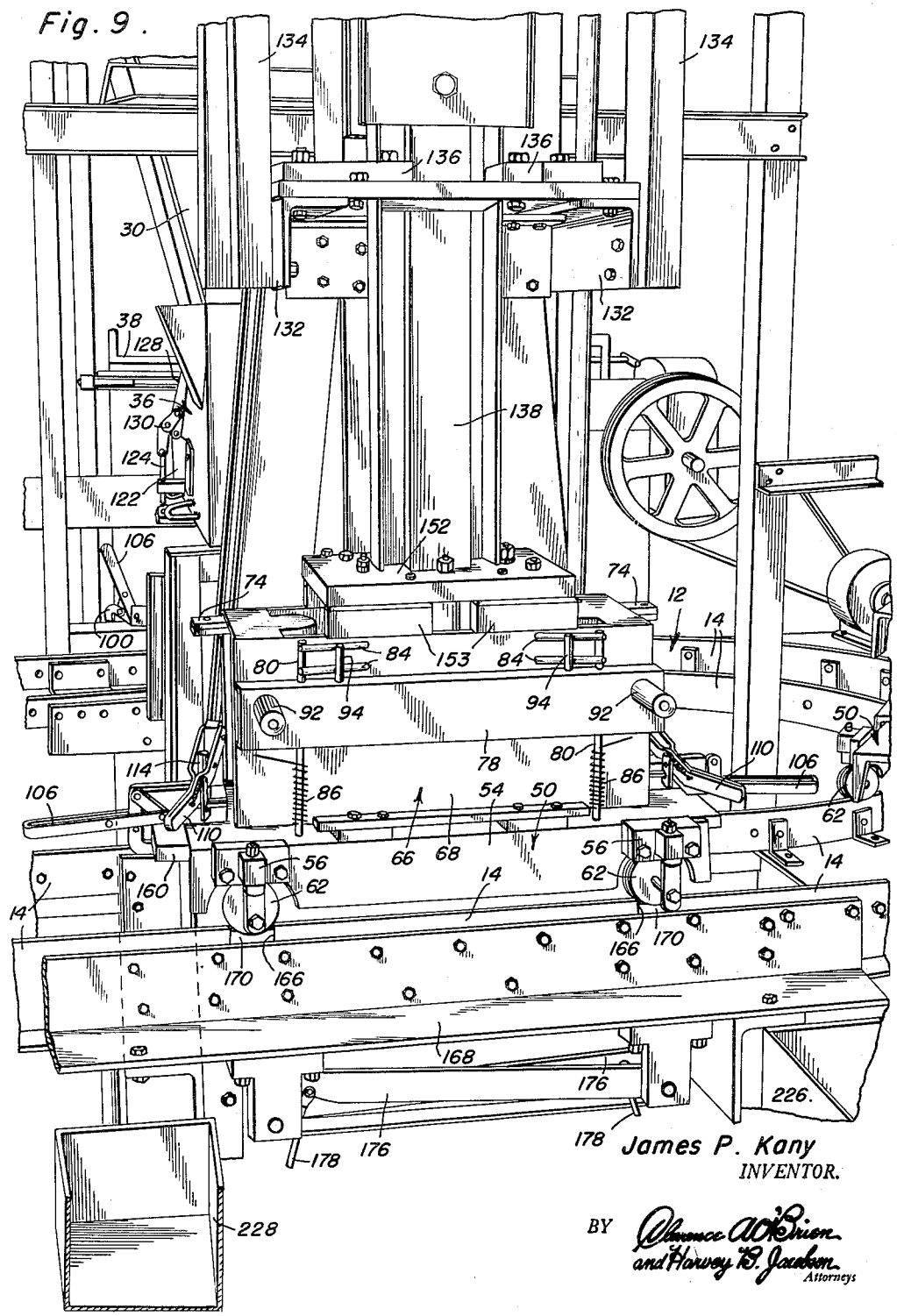
Figure 10:
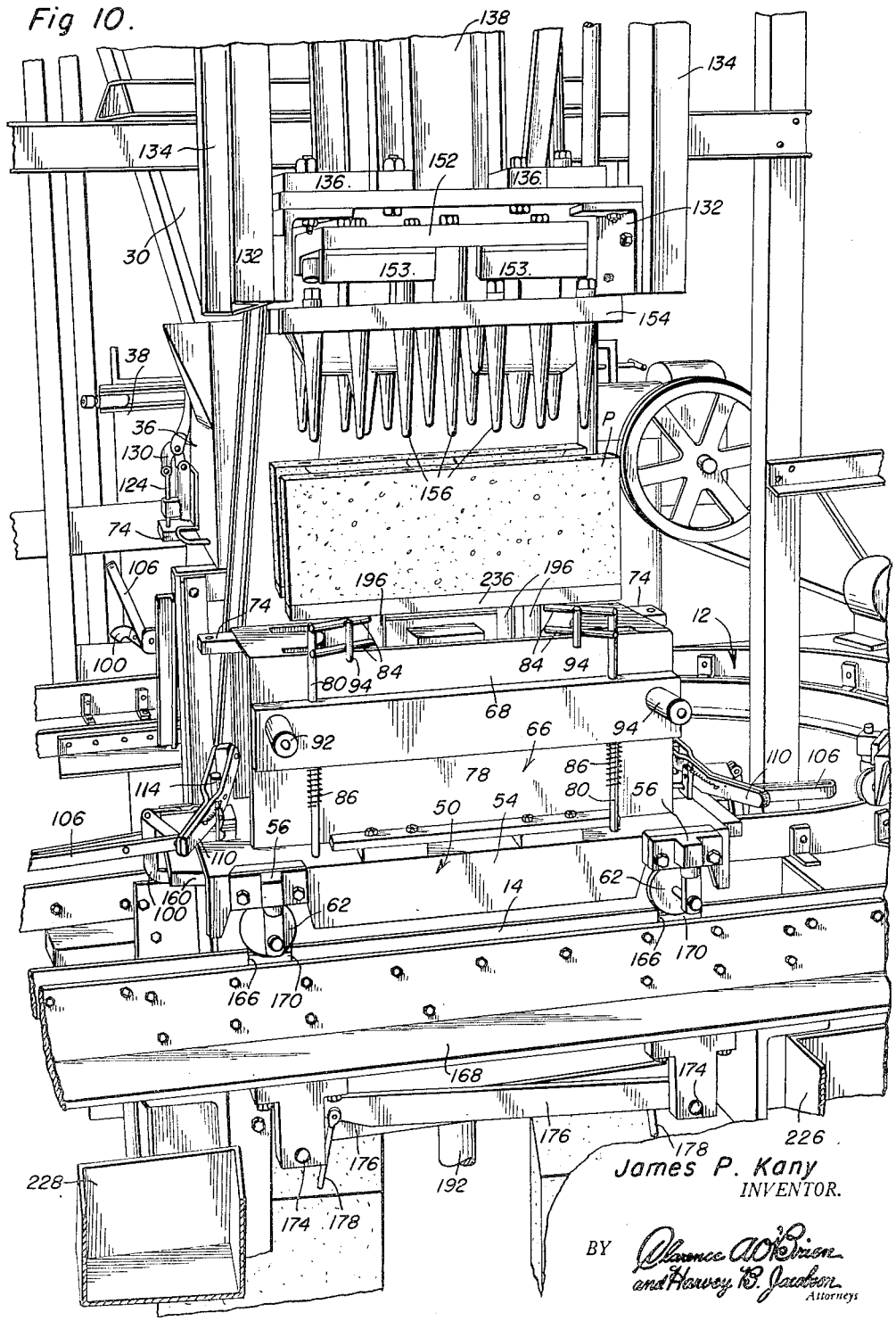
Figure 11:
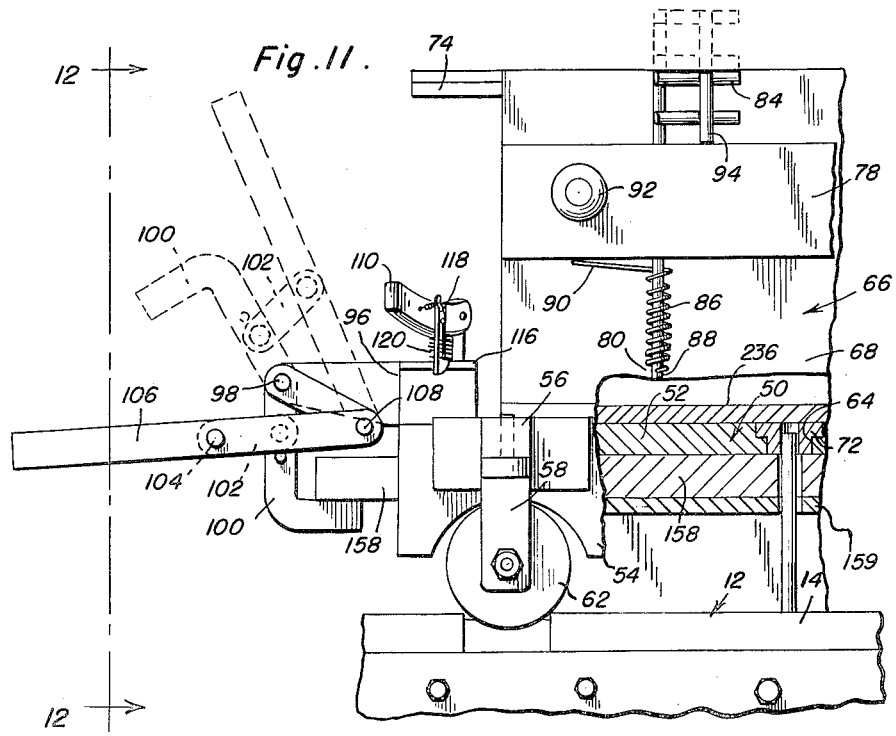
Figure 12:
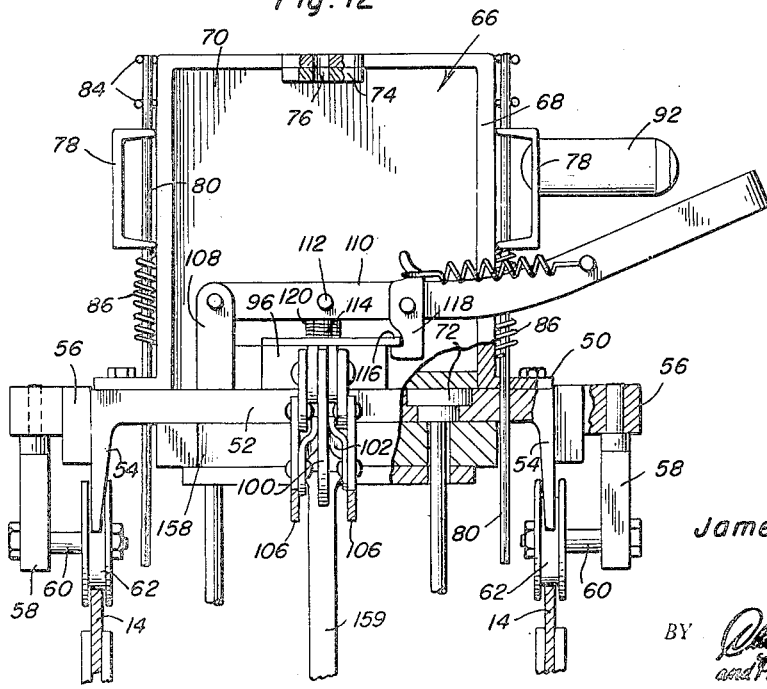

2 molding plastic aggregate embodying the features of this invention,

Figure 2 is a side view of the apparatus illustrated in Figure 1,

Figure 3 is a vertical sectional view taken substantially along the line 3—3 of Figure 1, Figure 4 is a fragmentary enlarged sectional view taken substantially along the line 4—4 of Figure 1, illustrating the mold supported on the bed plate, with the press head projected into the mold in the act of pressing the aggregate, Figure 5 is a view similar to Figure 4 illustrating the press head withdrawn from the mold, and the molded product ejected from the mold and supported in spaced relation thereto, Figure 6 is a fragmentary vertical sectional view taken substantially along the line 6—6 of Figure 5, Figure 7 is a fragmentary perspective view of the molding apparatus, Figure 8 is an enlarged fragmentary perspective view of the apparatus as viewed from the aggregate compressing and product ejecting station, illustrating the press head in its elevated position and the ejecting apparatus in its lowered position, Figure 9 is a view similar to Figure 8 showing a mold in place on the bed plate and the press head in aggregate compressing position, Figure 10 is a view similar to Figure 9 illustrating the press head withdrawn and the molded product ejected from the mold and supported in spaced relation thereto, Figure 11 is a fragmentary enlarged side view of a mold in position over the bed plate, with the hold down clamps and mold locating pins in closed position, Figure 12 is a sectional view taken substantially along the line 12—12 of Figure 11, and Figure 13 is a fragmentary vertical sectional view showing part of a car with a mold thereon disposed beneath the mold charging hopper.

Referring to the drawings in detail, this block molding apparatus embodies a main supporting column 10, encircling the base of which is an endless track designated generally 12 and comprising spaced rails 14 which, as illustrated in Figure 2, are supported on a suitable bed or foundation 16 in spaced relation to the ground 18. The column 10 is fixed in any suitable manner to the base or bed 16 and extends vertically adjacent one side of the ellipse formed by the track 12. A suitable super-structure comprising spaced parallel beams 20 is supported on columns 22 above the track 12 and these beams extend perpendicular to the longitudinal axis of the ellipse formed by the track 12. Extending alongside of the aggregate molding apparatus perpendicular to the longitudinal axis of the ellipse formed by the track 12 is a trackway designated generally 24 on which a conventional kiln car designated 26 runs. Supported on cross beams 28 near the upper end of the super-structure is an aggregate bin 30, the front and side walls of which converge toward its lower end to form a discharge mouth 32. Plastic aggregate is fed into the bin 30 by a conventional bin charging skip 38 which is adapted to carry aggregate from a conventional concrete mixer located on the ground upwardly on tracks 40, and deposit the aggregate in the upper open end of the bin, in order to keep an adequate supply of the aggregate in the bin.

A mold charging hopper 36 comprising a bottom wall 42 which projects horizontally in spaced relation to the bed or base 16 over the track 12 is formed in the bottom 42 directly over the track 12 with a discharge opening 44, and side walls 46 which project along opposite side edges of the bottom 42. These side walls are joined at their ends adjacent the track 12 by an end wall 48. It is to be noted that the mouth 32 of the bin 30 is disposed over the end of the hopper 36 remote from the aggregate discharge opening 44, so that when aggregate is to be discharged through the opening 44, it must be scraped manually toward the end wall 48. Suitable guards 48 are fixed to opposite side walls 46 and project longitudinally on each side of the hopper 36 to guide the spacer fingers later to be described.

Mounted for movement in a closed path along the track 12 are cars 50, each of which comprises a base or bed plate 52 which is provided adjacent longitudinal side edges with depending flanges 54. Suitable brackets 56 are attached in any suitable manner to the flanges 54, and these brackets are provided with depending arms 58 carrying adjacent their lower ends spindles 60 upon which grooved wheels 62 are rotatably supported. As illustrated in Figure 12, the arms 58 are swivelly connected with the brackets 56 so that the flanged wheels 62 may follow the curvature of the rails 14 of the track 12, as the car is moved along said track in its closed path.

The base or bed plate 52 of each car 50 has fixed thereto a mold designated generally 66, the side walls 68 and end walls 70 of which cooperate with the bed plate in forming a rectangular box-like structure in which the aggregate is received. Formed in the bed plate near each side wall 68 is a pair of spaced openings 64 in each of which is fitted a bushing 72. Projecting outwardly from the upper edges of opposite end walls 70 of the mold 66, substantially mid-way between the side walls 68 are ears 74 which are provided with apertures 76, the purpose of which will be more fully hereinafter explained. Projecting outwardly from opposite side walls 68 of the mold 66 are reinforcing channels which serve as guides 78 through which rods 80 are mounted to slide and rotate. As illustrated in Figure 12, these rods project downwardly through openings 82 in the bed or base 52, and carried by the upper ends of the rods 80 are spacer fingers 84. A torsion spring 86 surrounds each rod 80 with one end 88 anchored in its respective rod, while its opposite end 90 bears against its respective side wall 68, so that when its respective rod is moved upwardly, the fingers 84 will be moved across the top edge of their respective side wall 68. Suitable handles 92 are fixed to certain of the guides 78 to facilitate the movement of a car along the track 12. Fixed to each pair of fingers 84 adjacent their free ends, and extending parallel with the respective rod 80 is a stop member 94 which not only serves to hold the fingers 84 in spaced parallel relation, but also is adapted to engage the top face of its respective guide 78 when the fingers are in their lowered positions in order to limit the downward movement of its respective rod 80.

Fixed to each end of the bed 52 of each car substantially midway between opposite sides of the car are brackets 96, and mounted adjacent the outer end of each bracket 96 to rock about a horizontal axis is a shaft 98 carrying intermediate its ends a hold down hook 100 which is adapted to engage the underside of the bed plate, to be more fully hereinafter described, in order to secure and steady the mold 66 in proper position beneath the press head during the pressing operation. Pivoted to the hook 100 intermediate its ends is one end of a link 102, the opposite end of which is pivotally coupled as at 104 intermediate the ends of an operating lever 106, one end of which is pivoted as at 108 to its respective bracket 96. It will be understood, of course, that the end of the bracket 96 to which the hook 100 is pivoted, is bifurcated to accommodate the pivoted end of the hook.

Pivotally supported on brackets 108 at opposite ends of each car 50 are levers 110, each of which has pivotally coupled intermediate its ends as at 112 a vertically extending plunger 114 which works through an aperture in the bed 52 of the car and is adapted to enter an opening in the bed plate, to be more fully hereinafter described, in order properly to locate the car and mold 66 beneath the press head as will be more fully hereinafter explained. A suitable keeper 116 is attached to the upper side of each bracket 96, and pivotally connected to the hand lever 110 for cooperation with the keeper 116 in holding the pin 114 projected into the opening in the bed plate is a spring actuated latch 118. A compression coil spring 120 encircles the pin 114, with one end bearing on the top of the bracket 96 while the opposite end bears on the lever 110 in order to hold the lever elevated, and the pin 114 retracted during the movements of the car 50 along the trackway 12.

At the mold charging station, the hopper 36 supports on opposite side wall 46 outwardly extending brackets 122 (Figure 7) each of which is provided with a vertical guide opening through which a plunger rod 124 is mounted to slide. The lower end of each plunger rod 124 is tapered as at 126 to enter the opening 76 in the ear 74 of the mold 66 in order properly to position the mold, and car 50 beneath the discharge opening 44 of the hopper 36. A hand lever 128 is pivotally supported in the upper end of the bracket 122 and is provided with an eccentric 130 which is adapted to engage the upper end of its respective plunger 124, so that when the hand lever is moved outwardly away from its respective wall 46 of the hopper 36, the eccentric 130 will advance its respective plunger through the aperture in the bracket 122 and into the opening 76 of the ear 74 at the respective end of the mold 66. In this way a car moved with its mold into the mold charging station may be locked against shifting movement during the introduction of the plastic aggregate into the mold.

At the aggregate pressing station, the column 10 is provided with a pair of horizontally spaced outwardly extending arms 132 (Figure 3), the outer ends of which are joined by vertically extending spaced parallel tie members 134, and supported on the bracket arms are anti-friction plunger guides 136 in which a plunger rod 138 is mounted for vertical sliding movement. Pivotally connected to the upper end of the plunger rod as at 140 is the lower end of a piston rod 142, the upper end of which is connected to a piston which works within a cylinder 144, which is suspended at its upper end on a cross member 146 which is supported on the upper ends of the tie members 134, which as illustrated project upwardly beyond the upper end of the column 10. The cylinder 144 aligns axially with the plunger rod 138, and is provided adjacent opposite ends with ports through which fluid is introduced into the cylinder 144 through conduits 148 and 150. The lower end of the plunger rod 138 has fixed thereto a press head 152 to which a suitable core punch 154 is detachably secured in any conventional manner. The core punch 154 is provided with downwardly extending core forming elements 156 by which cored openings of any desired pattern may be formed in the finished product. Fixed to the underside of the press head 152 are stop members 153 which are adapted to engage the top edges of the side walls 68 of the mold 66 to limit the distance that the core punch 154 may enter the mold.

Rigidly supported directly beneath the press head 152 on an I beam 159 situated between the track rails 14 is a bed plate 158, opposite ends of which converge as at 160 to facilitate the movement of a car 50 over the bed plate. Formed in the bed plate adjacent each end is a vertical opening 162, which when a car is in proper position over the bed plate is adapted to receive a guide pin 114. Formed in the bed plate adjacent opposite side edges, and intermediate its ends are spaced parallel vertical openings 164 through which the ejector rods, to be more fully hereinafter described, are projected for ejecting the molded product from the mold.

Formed in the track rails 14 adjacent opposite ends of the bed plate 158 are cut-outs or spaces 166, and clamped to opposite sides of each track rail 14 are reinforcing angle members 168 between which vertically sliding track sections 170 are supported. The upper edges of the angles 168 terminate short of the upper edges of the track rails 14, so that when all four wheels 62 of a car encounter the sections 170, the sections will move downwardly under the weight of the car and mold carried thereby, so that the mold and car will be supported on the bed plate 158. Extending horizontally beneath the bed plate adjacent opposite ends, and transversely of the trackway 12 are rock shafts 172 carrying adjacent opposite ends cams 174 which as illustrated in Figure 5 engage the bottom edges of the track sections 170. When the wheels 62 of the car rest on the track sections 170, the pins 114 align with the openings 162, so that when the levers 110 are moved downwardly and latched by the latches 118, the pins 114 will be projected into the openings 162 to prevent the car and mold from shifting on the bed plate 158 from proper position beneath the press head 152. It is also preferred that having located the car in proper position on the bed plate 158, the levers 106 are manipulated to cause the hold down hook 100 to engage under opposite ends of the bed plate, and thereby clamp the car 50 and mold 66 to the bed plate 158.

Fixed to each shaft 172 adjacent one end thereof is a lever 176, and these levers project substantially horizontally toward one another as illustrated in Figures 4 and 5 in crossed relationship. One end of a link 178 is attached to a lever 176 adjacent the end remote from the shaft 172, and the lower ends of these links are pivoted to lever arms 180 which are fixed adjacent opposite ends of a horizontal rock shaft 182 mounted below the level of the track. Fixed to the rock shaft 182 is a treadle 184 which projects laterally from the rock shaft so that when the treadle is actuated, the shaft will rotate in its bearings 186 to exert pull on the links 178 and move the levers 176 downwardly to cause the shafts 172 to rock and move the cams 174 in a direction to elevate the track sections 170, so that their upper edges align with the upper edges of the track rails 14, as illustrated in Figure 8.

Mounted directly beneath the center of the bed plate 158, is an hydraulic cylinder 187 through the upper end of which works a piston rod 188, the lower end of which is fixed to a piston which reciprocates within the cylinder 186 under the influence of hydraulic pressure. Pivotally connected as at 190 to the upper end of the piston rod 188 is an ejector plunger designated 192, and fixed to the upper end of the ejector plunger 192 is an ejector head 194 which is arranged for vertical sliding movement directly beneath the bed plate 158. Fixed to the ejector head 194 and extending upwardly therefrom are ejector rods 196 which, as illustrated in Figures 4 and 5, align with the openings 164 in the bed plate 158. Fixed to the head 194 in vertical alignment with the lower ends of the rods 80 are upwardly extending extending rod lifters 198 which as illustrated in Figure 5, serve to raise the rods 80 as the product is ejected from the mold to a point where the fingers 84 will swing about the axes of their respective rods 80 to a position between the upper edge of the mold and the underside of the pallet supporting the product as illustrated in Figures 5 and 10.

As illustrated in Figure 1, the aggregate pressing station is located on the minor axis of the elliptical trackway 12 directly opposite the mold charging station, and located on the major axis of the elliptical trackway 12 adjacent the track 24 along which the carriage 26 operates is the product transfer station, at which is located a crane designated generally 200. This crane comprises an arm 202 which is pivotally supported as at 204 on one of the horizontal beams 20, and pivotally supported as at 206 at the opposite end of the arm 202 is an arm 208 from the free end of which is suspended as at 210 an hydraulic cylinder 212. The cylinder 212 is equipped with a conventional piston mounted for reciprocation therein under the influence of hydraulic fluid and having attached thereto a piston rod 214 which operates through the lower end of the cylinder 212 and has connected adjacent its lower end a flexible member or suspension cable 216 carrying at its lower end a product lifting hook 218. Hydraulic fluid is fed into the lower end of the cylinder 212 through a conduit 220 which is coupled to a suitable source of hydraulic pressure supply through the medium of a lever actuated valve 222 of any suitable construction so that upon downward movement of the lever thereof, fluid pressure will be admitted to the lower end of the cylinder 212. A pull rod 224 is attached to the lever of the valve 222 and extends downwardly to a location within easy reach of the operator of the machine so that as the compressed product is moved to the product transfer station it may be engaged by the hook 218 and upon exerting pull on the rod 224, the product may be lifted from its position on the mold and manually transferred to the carriage 26. The valve 222 and the hydraulic system is such that upon moving the lever of said valve upwardly beyond a neutral position, the fluid may be exhausted from the cylinder 212 in any conventional manner. In this way the product which has been elevated by the hook 218 may be lowered into position on the carriage 26.

Fluid is admitted through the conduits 148 and 150 in proper sequence, and the flow of the fluid into the cylinder 144 is governed by conventional valves mounted on one side of the pit containing the treadle 184 and protected by a valve guard 226, and the movements of the piston rod 188 into and out of the cylinder 186 are governed by a conventional valve contained within a valve guard 228 on the opposite side of the pit. The fluid is conducted to and from the cylinder 186 through the conduits 230 and 232, the hydraulic fluid being supplied from a conventional source of pressure through a conduit 234 to the valves in both valve guards 226 and 228. The molds 66 are designed to use conventional pallets 236 while the machine is designed for employing a group of cars 50 all operating on the elliptical trackway 12, and each equipped with its respective mold 66. The cars are advanced along the trackway 12 by an operator who grasps the handles 92 and propels the car thereby. Moving past the pallet loading station a pallet is selected and placed in the bottom of the mold 66 and the car is advanced to a position beneath the discharge opening 44 of the mold charging hopper 42. The aggregate contained within the bin 30 falls by gravity through the mouth 32 into the hopper 36, and an adequate quantity of the aggregate to produce a mold charge is scraped by any suitable hand actuated scraper along the bottom 42 of the hopper 36 and deposited in the mold through the discharge opening 44. It will be understood that if so desired a dummy core 238 may first be introduced into the mold 66 in order that the operator in filling the mold may gauge the quantity of aggregate simply by filling the mold to the top and subsequently removing the dummy core 238 before the car and mold is moved to the pressing station. The charged mold is then propelled on its respective car 50 to a position over the bed plate 158. As the car moves to a point approximately properly located over the bed plate, the wheels 62 of the car encounter the depressible sections 170 of the track rails 14, and the weight of the charged mold and car will cause the track rail sections 170 to move downwardly, thereby rocking the shafts 172 and moving the ends of the levers 176 remote from the shafts 172 upwardly. This will rock the rock shaft 182, and lift the free end of the treadle 184. With the car thus preliminarily located over the bed plate 158, and resting thereon, due to the depression of the track sections 170, the levers 110 are moved downwardly to project the pins 114 into the openings 162 in the bed plate 158, thus accurately locating the charged mold on the bed plate. Locking of the mold and car in proper position on the bed plate is effected by moving the levers 106 downwardly as shown in Figure 4 to cause the clamp hooks 100 to engage beneath opposite ends of the bed plate 158.

With the car thus locked in place, the valve in the valve guard 226 is manipulated to cause the plunger 138 to descend under the influence of hydraulic pressure admitted to the cylinder 144 and thus force the cores 156 carried by the core punch 154 into the mold. The cores entering the mold will cause the aggregate to be formed around them and the pressure exerted on the press head 152 by the hydraulic pressure within the cylinder 144 will compress the aggregate within the mold about the core, thus forming cored openings in the aggregate contained within the mold 66. Obviously by manipulating the valve contained within the valve guard 226, the press head 152 and the core punch 154 and cores 156 may be reciprocated so as to strike repeated blows against the aggregate contained within the mold in order to achieve the desired density of the product and proper compacting of the aggregate. With the product thus formed, the valve within the valve guard 226 is manipulated to elevate the press head 152 and withdraw the core punch and cores 156 from the mold. Simultaneously the valve contained within the valve guard 228 may be manipulated to cause the ejector plunger to move upwardly, thus raising the ejector head and causing the ejector rods 196 to move upwardly through the openings 164 in the bed plate 158 so as to engage the underside of the pallet 236 and lift the pallet, together with the product P out of the mold as illustrated in Figures 5 and 6. Upward movement of the ejector head 194 also raises the lift fingers 198, and causes them to contact the bottom ends of the rods 80, as the product P approaches its most elevated position. Lifting the rods 80 will cause the fingers 84 to move upwardly above the upper edges of the side walls of the mold 66, and as the lowermost finger 84 on each rod 80 clears the upper edge of its respective side wall, the spring 86 on its respective rod will cause the fingers to rotate about the longitudinal axes of their respective rods so as to move inwardly toward the longitudinal axis of the mold. In this way the fingers 84 are positioned automatically between the underside of the pallet 236 and the upper edge of their respective side walls so that when the ejector rods 196 return to their lowered position by the manipulation of the valve contained within the valve guard 228, the product P and pallet 236 will be supported in spaced relation to the upper open end of the mold. With the product P and its pallet 236 thus sustained, the operator steps on the treadle 184, thus rocking the shaft 182, and causing the cams 174 to rock about the axes of the shafts 172 and move the track sections 170 upwardly until their upper edges lie in a plane with the upper edges of the track rails 14, it being understood that the clamp hooks 100 are first released from engagement beneath the ends of the bed plate 158. Releasing the latches 118 at opposite ends of the mold 66, the pins 114 will be extracted from the openings 162 in the bed plate 158 under the influence of the springs 120 and the car will be free to be advanced along the trackway 12 to the transfer station. At the transfer station, the operator exerts downward pull on the pull rod 224, thus actuating the valve 222 to cause the hook 218 to be lowered into a position at which it may be engaged under the pallet 236 as suggested in Figure 7, so that when the pull rod 224 is moved upwardly, the pallet 236 and its product P will be lifted bodily off of the mold, and may be swung by reason of the joined arms 202 and 208 into a position over the carriage 26. Upon lowering the pallet and the product, they may be deposited on the carriage 26 and the hooks 218 disengaged, so that the pallet and product may be moved with the carriage 26 to the curing kilns. The mold, and car may then be advanced to the pallet loading station located between the transfer station and the mold charging station for a repeat operation.

The hopper 39 is periodically replenished by elevating the skip 38 and dumping the contents thereof into the aggregate bin, it being understood that the skip may be charged when in its lowered position directly from a conventional aggregate mixer (not shown).

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. Apparatus for molding plastic aggregate which includes a mold movable in a closed path from a pallet loading station to an aggregate feeding station, said mold being movable along said path to an aggregate compressing station and a product ejecting station and said mold being movable along said path to a product transfer station, an aggregate compressing plunger at the aggregate compressing station, said plunger being movable in a rectilinear path into and out of the mold to compress the aggregate in the mold and a product ejector at the aggregate compressing station movable in a rectilinear path which aligns with the path of movement of the plunger to eject the compressed aggregate from the mold, and means carried by the mold to hold the ejected product in spaced relation to the mold.

2. Apparatus for molding plastic aggregate which includes a mold movable in a closed path from a pallet loading station to an aggregate feeding station, said mold being movable along said path to an aggregate compressing station and a product ejecting station and said mold being movable along said path to a product transfer station, an aggregate compressing plunger at the aggregate compressing station, said plunger being movable in a rectilinear path into and out of the mold to compress the aggregate in the mold and means at the aggregate compressing station automatically to stop and hold the mold in the path of movement of the plunger, and a product ejector at the aggregate compressing station movable in a rectilinear path which aligns with the path of movement of the plunger to eject the compressed aggregate from the mold, and means carried by the mold to hold the ejected product in spaced relation to the mold.

3. Apparatus for molding plastic aggregate which includes a mold movable in a closed path from a pallet loading station to an aggregate feeding station, said mold being movable along said path to an aggregate compressing station and a product ejecting station and said mold being movable along said path to a product transfer station, an aggregate compressing plunger at the aggregate compressing station, said plunger being movable in a rectilinear path into and out of the mold to compress the aggregate in the mold and a product ejector at the aggregate compressing station movable in a rectilinear path which aligns with the path of movement of the plunger to eject the compressed aggregate from the mold, rods pivotally mounted on opposite sides of the mold to slide longitudinally, spacing fingers carried by the rods, means carried by the ejector for engaging the rods as the ejector approaches product ejecting position and sliding them longitudinally, and means to urge the spacing fingers into a position between the mold and the product as the spacing fingers pass beyond the side of the mold through which the product was ejected.

4. Apparatus for molding plastic aggregate which includes a mold movable in a closed path from a pallet loading station to an aggregate feeding station, said mold being movable along said path to an aggregate compressing station and a product ejecting station and said mold being movable along said path to a product transfer station, an aggregate compressing plunger at the aggregate compressing station, said plunger being movable in a rectilinear path into and out of the mold to compress the aggregate in the mold and means at the aggregate compressing station automatically to stop and hold the mold in the path of movement of the plunger and a product ejector at the aggregate compressing station movable in a rectilinear path which aligns with the path of movement of the plunger to eject the compressed aggregate from the mold, rods pivotally mounted on opposite sides of the mold to slide longitudinally, spacing fingers carried by the rods, means carried by the ejector for engaging the rods as the ejector approaches product ejecting position and sliding them longitudinally and means to urge the spacing fingers into a position between the mold and the product as the spacing fingers pass beyond the side of the mold through which the product was ejected.

5. Apparatus for molding plastic aggregate which includes a mold-carrying car movable in a closed horizontal path from a pallet loading station to an aggregate feeding station, and an aggregate compressing station, a fixed bed plate at the aggregate compressing station, means at the aggregate compressing station to arrest the mold and lower it into contact with the bed plate, a product ejector movable upwardly for ejecting the molded product from the mold, and means carried by the mold and engageable beneath the ejected product to support the latter in spaced relation to the mold after being rejected from the latter.

6. Apparatus for molding plastic aggregate which includes a mold movable in a closed path from a pallet loading station to an aggregate feeding station, said mold being movab'e along said path to an aggregate compressing station, a bed plate at the aggregate compressing station above which a plunger moves vertically, means at the aggregate compressing station to arrest the mold and lower it into contact with the bed plate in alignment with the plunger, and a product ejector movable in a rectilinear path coincident with the path of movement of the plunger for ejecting the molded product from the mold, and means carried by the mold to support the ejected product in spaced relation thereto.

7. Apparatus for molding plastic aggregate which includes a mold movable in a closed path from a pallet loading station to an aggregate feeding station, said mold being movable along said path to an aggregate compressing station, a bed plate at the aggregate compressing station above which a plunger moves vertically, means at the aggregate compressing station to arrest the mold and lower it into contact with the bed plate in alignment with the plunger, and a product ejector movable in a rectilinear path coincident with the path of movement of the plunger for ejecting the molded product from the mold, and spring actuated fingers mounted on opposite sides of the mold to move into the space between the mold and the product ejected therefrom to hold the product in spaced relation to the mold.

8. Apparatus for molding plastic aggregate which includes a mold-carrying car movable in a closed horizontal path from a pallet loading station to an aggregate feeding station, and an aggregate compressing station, a fixed bed plate at the aggregate compressing station, means at the aggregate compressing station to arrest the mold and lower it into contact with the bed plate, and clamps carried by the mold for engaging the bed plate and clamping the mold thereto during the compressing of the aggregate in the mold.

9. Apparatus for molding plastic aggregate which includes a mold-carrying car movable in a closed horizontal path from a pallet loading station to an aggregate feeding station, and an aggregate compressing station, a fixed bed plate at the aggregate compressing station, means at the aggregate compressing station to arrest the mold and lower it into contact with the bed plate, said bed plate having a mold locating opening adjacent each end, a manually actuated mold locating pin carried by each end of the mold for entrance into a registering mold locating opening in the bed plate, and a hold down clamp carried by each end of the mold for engaging the underside of the bed plate and clamping the mold to the bed plate.

10. Apparatus for molding plastic aggregate which includes an endless track, a car movable along said track, spaced pairs of short depressible sections in said track adapted to receive the individual wheels of and to lower under the weight of the car, a fixed bed plate between the pairs of depressible track sections, a mold carried by the car and adapted to rest on the bed plate when the car encounters the depressible sections, a plunger movable in a rectilinear path above the bed plate for entering the mold and compressing aggregate therein while the mold is supported by the bed plate, means operable through the bed plate to eject the molded product from the mold toward the plunger, and foot-operated means to lift the depressible track sections and thereby lift the mold off of the bed plate.

11. Apparatus for molding plastic aggregate which includes an endless track, a car movable along said track, spaced pairs of short depressible sections in said track adapted to receive the individual wheels of and to lower under the weight of the car, a fixed bed plate between the pairs of depressible track sections, a mold carried by the car and adapted to rest on the bed plate when the car encounters the depressible sections, a plunger movable in a rectilinear path above the bed plate for entering the mold and compressing aggregate therein while the mold is supported by the bed plate, and foot-operated means to lift the depressible track sections and thereby lift the mold off of the bed plate.

12. Apparatus for molding plastic aggregate which includes a mold-carrying car movable in a closed horizontal path from a pallet loading station to an aggregate feeding station, an aggregate compressing and product ejecting station, and a product transfer station, supporting means carried by the mold and automatically engageable beneath the pallet of a molded product to support the product above the mold when ejected from the latter, and a crane at the transfer station for lifting the ejected product and its pallet from said supporting means and transferring it to an adjacent kiln car.

JAMES P. KANY.

REFERENCES CITED

The following references are of record in the file of this patent:

UNITED STATES PATENTS

| Number | Name | Date |
|---|---|---|
| 812,123 | Forbes | Feb. 6, 1906 |
| 822,013 | Pauly | May 29, 1906 |
| 1,094,026 | Simmonds | Apr. 21, 1914 |
| 1,142,696 | Graf et al. | June 8, 1915 |
| 1,253,676 | Fishack | Jan. 15, 1918 |
| 1,399,325 | Straub | Dec. 6, 1921 |
| 1,429,459 | Schol | Sept. 19, 1922 |
| 1,433,300 | Quillet | Oct. 24, 1922 |
| 1,481,159 | Straub | Jan. 15, 1924 |
| 1,599,151 | Vought | Sept. 7, 1926 |
| 1,733,706 | Widin | Oct. 29, 1929 |
| 1,754,484 | Pelton | Apr. 15, 1930 |
| 1,770,303 | Enticknap | July 8, 1930 |
| 1,778,332 | Meyer | Oct. 14, 1930 |
| 2,226,966 | Cannon | Dec. 31, 1940 |